United States Patent [19]

Hames

[11] Patent Number: 4,907,118

[45] Date of Patent: Mar. 6, 1990

[54] VISUAL INDICATOR ELECTRICAL PLUG-TYPE SURGE PROTECTOR AND SYSTEMS

[75] Inventor: Edward L. Hames, Peterborough, N.H.

[73] Assignee: Curtis Manufacturing Company, Inc., Jaffrey, N.H.

[21] Appl. No.: 321,590

[22] Filed: Mar. 9, 1989

[51] Int. Cl.[4] .......... H02H 9/04

[52] U.S. Cl. .......... 361/56; 361/58; 361/111; 361/127; 340/653; 340/662; 374/162; 337/28; 337/265; 337/243

[58] Field of Search .......... 361/56, 58, 111, 119, 361/127, 91, 104, 106; 340/638, 662, 653; 338/162, 227; 374/174, 161, 162; 337/28, 32, 243, 265, 24

[56] References Cited

U.S. PATENT DOCUMENTS

| | | | |
|---|---|---|---|
| 3,184,726 | 5/1965 | Hellgren | 337/243 |
| 3,877,411 | 4/1975 | MacDonald | 374/162 |
| 3,890,030 | 6/1975 | McDaniel | 324/510 |
| 4,127,837 | 11/1978 | Borchart | 337/265 |
| 4,739,439 | 4/1988 | Stefani et al. | 361/127 |
| 4,743,999 | 5/1988 | Haines | 361/56 |
| 4,807,083 | 2/1989 | Austin | 361/111 |
| 4,829,539 | 5/1989 | Angus et al. | 374/162 X |

*Primary Examiner*—Todd E. Deboer

*Attorney, Agent, or Firm*—Richard P. Crowley

[57] ABSTRACT

An inexpensive, compact, portable, visual indicator electrical plug-type surge protector which comprises an electrical plug body composed of a molded transparent polymer, the plug body having an extended male grounding prong and a pair of male electrical prongs on one face and a female receiving grounding inlet and a pair of female receiving inlets on the opposite face. The plug body contains in a visually indicating position, generally slightly below the surface of the plug body, a metal oxide varistor electrically connected to the electrical outlet plug so as to prevent electrical surges from passing through the surge protector from the electrical source into which the electrical plug-type surge protector is plugged and to be activated and to change color on the occurrence of an electrical surge so that the user of the surge protector will know when the electrical surge has been received and thereby be able to replace the surge protector with a new surge protector. Visual indicating surge protectors are designed to be plugged in to standard electrical apparatus or other sensitive electronic device which is to be protected from electrical surges.

11 Claims, 1 Drawing Sheet

VISUAL INDICATOR ELECTRICAL PLUG-TYPE SURGE PROTECTOR AND SYSTEMS

BACKGROUND OF THE INVENTION

Electrical surge protectors or surge suppressors are well-known devices which are designed to prevent a sensitive electronic or electrical device from damage on the occurrence of electrical surges from the electrical power source to which the sensitive electronic and electrical device is connected for use. Generally, surge protectors are adapted to be plugged into a standard electrical outlet and to be positioned between the source of the electrical power and the sensitive electronic or electrical device to be protected from electrical surges. For example, in one type of presently employed surge protectors, the surge protector is designed to be plugged into a standard electrical outlet, such as a wall outlet, and comprises an electrical fuse and light in electrical communication whereby when an electrical surge, such as an overvoltage, is received through the surge protector, the fuse is blown and the light goes off to indicate that an electrical surge has been received. For example, one type of such a presently employed surge protector would comprise a plastic molded, single plug having a clear plastic window wherein the light is visible, but which contains a light and a fuse with the light going off on the occurrence of an electrical surge. These single, box-like type surge protectors are generally injected molded and require the separate installation of a back plate and the insertion of the fuse and light and thus tend to be complicated to manufacture requiring several steps.

Another type of surge protector for example is illustrated in U.S. Pat. No. 4,743,999, issued May 10, 1988, which comprises a rotary surge protector designed for plugging in to a standard electrical outlet and to protect particular telephone line electrical surges. There is no visual indication of an electrical surge in the rotary surge protector. Such surge protector is designed to receive standard telephone jacks therein.

It is desirable to provide for simply manufactured, inexpensive, portable, compact surge protector for use with a standard wall or floor outlet and which may quickly and easily visually indicate when an electrical surge has been received so that the surge protector may be replaced.

SUMMARY OF THE INVENTION

This invention relates to an electrical plug-type visual indicator surge protector and to systems employing such electrical plug-type surge protectors. In particular, the invention concerns a visually indicating, electrical plug-type surge protector wherein a varistor is positioned close to the surface of the surge protector and which varistor changes color to indicate an electrical surge.

The invention comprises a visually indicating electrical plug-type surge protector which comprises a plug body composed of a polymer. The plug body typically is a molded polymer and typically and preferably a generally transparent or translucent polymer, such as a rigid vinyl chloride polymer, such as a PVC resin, or other electrically non-conductive polymer suitable for use as a plug body. The plug body contains an optional male grounding prong and a pair of generally parallel male extending electrical prongs extending from one face of the plug body, the male grounding prong and the electrical male prongs adapted to be inserted into a standard electrical outlet, such as a standard electrical wall or floor plug, or other electrical plug. The plug body also includes, generally on the other opposite face from the male prongs, a female grounding plug inlet optionally and a pair of female electrical plug inlets which are in electrical communication respectively with the male grounding prong and the male plug prongs, and generally which extend through the plug body so that the female inlets are on one face and the male outlets are on the opposite face. The female inlets are adapted to receive therein an electrical plug, typically a two- or three-way plug, and the line cord of an electrical apparatus or an extension thereof, which apparatus is electrically sensitive and is designed to be protected from electrical surges, such as current or voltage surges, from the electrical source through which the electrical outlet operates.

The plug body includes therein a varistor means, such as a metal oxide varistor, which is in electrical communication to act as a surge protector, that is, typically it is electronically welded across the neutral, inactive and the electrically active prong and so designed that when an electrical surge passes through the varistor, the electrical surge is prevented from reaching the sensitive electrical apparatus or is dissipated to ground. The varistor means is encapsulated or positioned within the plug body and typically positioned in a visually indicating position beneath or close to the surface of the plug body so as to be visible to a plug user generally through a transparent part of the plug body or in a slight layer of the transparent polymer where the transparent polymer forms the entire plug body so that it is visible. Typically, the metal oxide varistor is composed of a flat, circular material, but can be designed to be of any size or shape and with the desired electrical characteristics required to provide for electrical surge protection.

The varistor selected should be so selected and adapted to change color when activated by the desired electrical surge, such as to change color from a light color, e.g. gold, to a dark color, e.g. black. Generally, electrical metal oxide varistors are available in flat sheet, circular form and may be composed of a variety of light colors depending upon the manufacturer. In the surge protector of the invention, the metal oxide varistor is placed close to the surface in visually indicating position with a slight layer of a transparent cover of a transparent polymer so it can be observed by the user and electrically connected so that on receiving an electrical surge the varistor changes generally to a darker color, such as going from a gold to a black color, that is, from a gold, non-activated to a black activated color. The varistor is typically placed on the face of the plug body between the opposing faces of the male and female inlets and outlets so that on normal insertion of the electrical plug-type surge protector into a standard outlet, the varistor is in an upward positon so that it can be easily observed by the user on change of color.

The surge protector of the invention is easily manufactured, during the molding process by electronically tack welding a circular, metal oxide varistor across the neutral, inactive prong and then directly injecting molding the plug body polymer about the male and female plugs and the varistor so that the manufacture is easily accomplished in a simple, one-step molding operation. The electrical plug-type surge protector of the invention is designed for use with a standard AC electrical outlet, which electrical outlet is connected to a source of standard power, such as an AC source, with the male prongs of the surge protector inserted into the electrical power outlet, and the two- or three-prong electrical plug extending from the electrical apparatus or sensitive electronic apparatus to be protected from electrical surges being plugged either directly or through line cord extensions into the female inlets of the surge protector. Generally, the sensitive electronic apparatus would comprise color copiers, telephones, copying machines, modems, telex machines, personal computers, printers and other types of sensitive electrical equipment.

In use, after connection to form an electrical system, the user may merely observe the coloration of the metal oxide varistor in order to determine whether an electrical surge has been received, and therefore to replace the electrical plug with a new plug to provide further protection for the device. In the visual indicating color change of the metal oxide varistor, this color change is irreversible. However, it is recognized that reversible color change in electrical devices may be employed.

The electrical surge protector of the invention will be described with reference to certain, particular embodiments and systems; however, it is recognized that those persons skilled in the art may make various changes, modifications, additions and improvements to the surge protector as described and the systems, all without departing from the spirit and scope of the invention

BRIEF DESCRIPTION OF THE EMBODIMENTS

Figure 1:
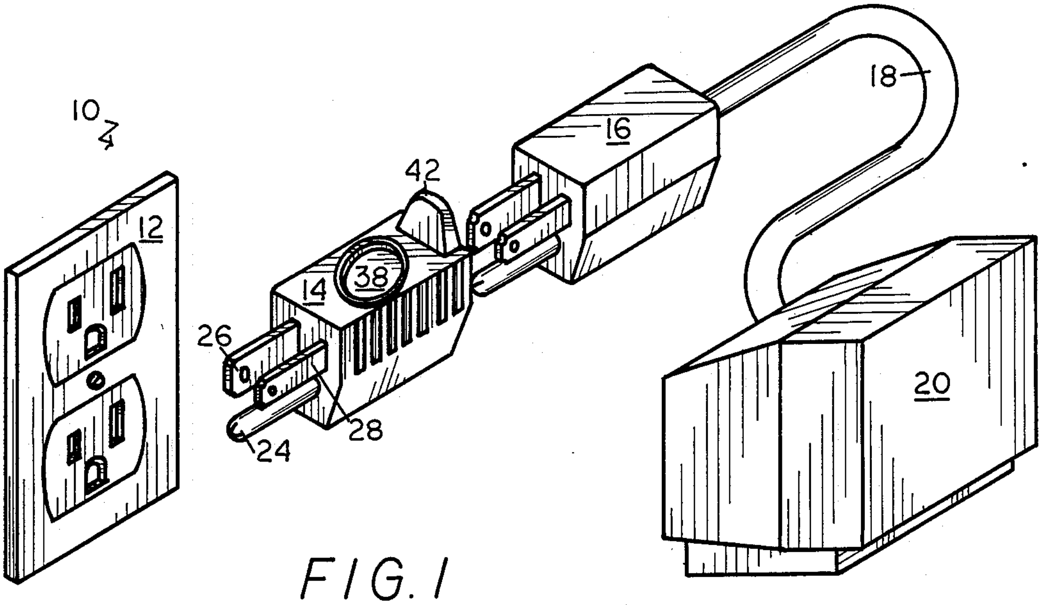
FIG. 1 is a schematic, perspective, exploded, illustrative view of an electrical system including the surge protector of the invention.
Figure 2:
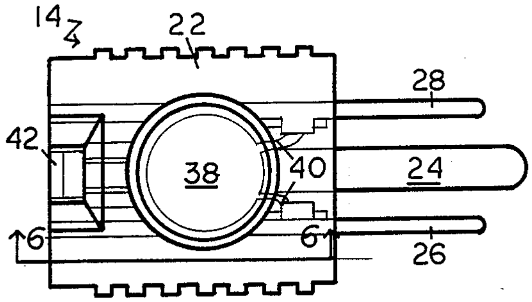
FIG. 2 is a top plan view of the surge protector of FIG. 1.
Figure 3:
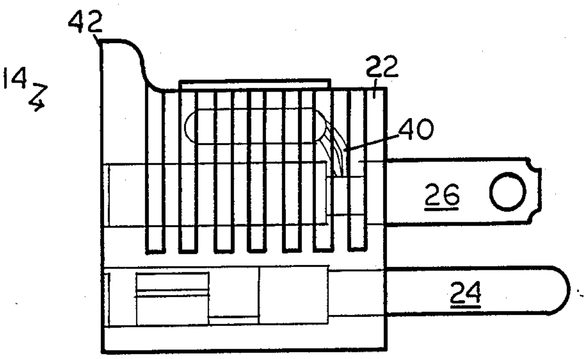
FIG. 3 is a side elevational view of the surge protector of FIG. 1.
Figure 4:
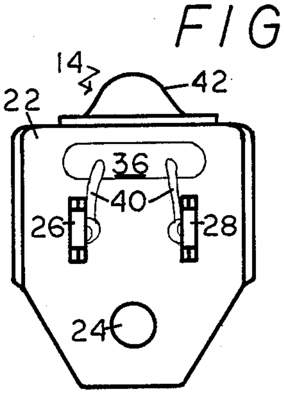
FIG. 4 is a one end plan view of the surge protector of FIG. 1.
Figure 5:
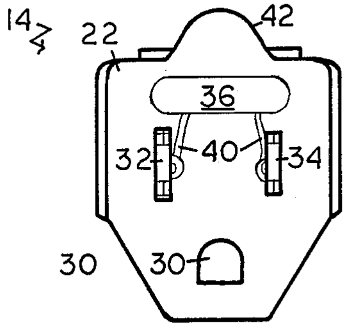
FIG. 5 is the other end plan view of the surge protector of FIG. 1.
Figure 6:
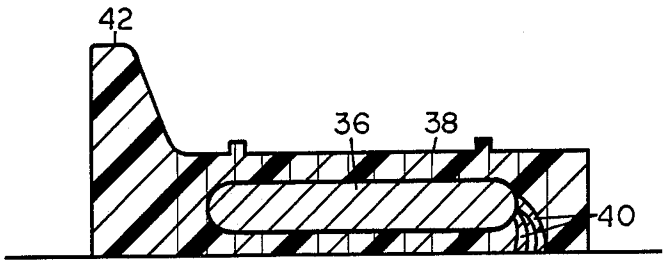
FIG. 6 is a fragmentary, enlarged, sectional view along line 6—6 of FIG. 3.

FIG. 1 shows a surge protected electrical system 10 with a standard AC electrical wall or floor outlet 12 connected to a source of electrical power (not shown). The system includes a visual indicator electrical plug-type surge protector 14 (for example, 125 V, 15 A, 60 Hz clamping voltage 400 V) adapted to be plugged directly into the outlet 12 and a standard two- or three-prong (shown) electrical plug 16 at the end of an electrical cord 18 which goes to an electrical surge-sensitive electrical apparatus 20 which is designed to be protected by the surge protector 14.

FIGS. 2–6 show in greater detail the plug surge protector 14 which includes a molded transparent plug body 22 composed for example of a transparent-translucent, molded, rigid PVC polymer. The plug body 22 at one end has an electrical male grounding prong 24 and standard, spaced apart male prongs 26 and 28 adapted to be inserted into a standard electrical outlet. The prongs 24, 26 and 28 extend directly through the plug body 22 and so that on the opposite face of the plug body 22 are a corresponding female grounding prong inlet 30 and two female prong inlets 32 and 34. The plug body 22 includes the stand UL bump or tab 42 which prevents any standard electrical plug from being incorrectly inserted into an outlet. The plug body 22 includes a circular, for example, light gold colored, metal oxide varistor (MOV) 36 of selected electrical characteristics (such as 130 volt MOV 38 joules) to act as a visual indicator surge protector. The MOV is incorporated within the plug body 22 and close to the surface so that a thin transparent layer extends over the MOV 36 during the molding process. The MOV 36 is electronically welded 40 across the hot and neutral prongs of the plug 14 to act as a surge protector. The polymer surface 38 above the MOV 36 is preferably polished to enhance clarity.

In use, the connected system shows in FIG. 1 (system shown for illustration only in an exploded view) the visual indicator electrical plug surge protector 14 protects apparatus 20 from overvoltage or current surges. On an electrical oversurge above the design limits, the light colored MOV 36 changes to a dark black color and prevents the surge from damaging the apparatus 20. The MOV 36 is generally positioned on the tab 42 so that it is easily visible to the user so that on darkening, the plug 14 may be removed and replaced with a new plug 14.

The plug surge protector provides for a simple, inexpensive, visual indicator surge protector.

What is claimed is:

1. A visual indicator electrical plug surge protector which comprises:

(a) a molded polymeric plug body;

(b) the plug body having on one face a grounding prong and a pair of parallel male electrical prongs, the grounding prong and the electrical prongs adapted to be inserted into an electrical output plug;

(c) The plug body having on an other face a female grounding plug inlet and a pair of female electrical plug inlets in electrical communication with the respective male grounding prong and male plug prongs and adapted to receive therein an electrical plug from an electrical apparatus which apparatus is to be protected from electrical surges from the electrical outlet plug; and (d) a varistor means in electrical communication to act as a surge protector for electrical signals from the electrical outlet plug, the varistor means positioned close to the surface of the plug body to be visible to a plug user through a transparent part of the plug body and adapted to be activated and change color on the occurrence of an electrical surge whereby the user by visually observing the varistor means can determine if an electrical surge has occurred an can replace the said activated surge protector.

2. The surge protector of claim 1 wherein the plug body comprises a transparent polymer.

3. The surge protector of claim 1 wherein the varistor means comprises a metal oxide varistor

4. The surge protector of claim 3 wherein the metal oxide varistor comprises a flat circular material which changes to a dark color on activation.

5. The surge protector of claim 1 wherein the varistor means comprises a metal oxide varistor encapsulated in the transparent plug body and positioned slightly below the face of the plug body which face extends upwardly so that the varistor means is easily visible when the surge protector plug is inserted into the electrical outlet plug.

6. The surge protector of claim 1 wherein the said male prong outlets extend directly through the plug body and provide electrical contact with the female inlets.

7. The surge protector of claim 1 wherein the plug body comprises a generally transparent polymer and a thin layer of said polymer of the plug body extends over the outward surface of the varistor means.

8. The surge protector of claim 1 wherein the female and male inlets and outlets are on directly opposite faces of the plug body.

9. A surge protector system, which system comprises:

(a) the surge protector of claim 1;

(b) an electrical plug outlet connected to a source of electrical power and the male prongs of the said surge protector inserted into the electrical power outlet; and (c) an electrical apparatus to be protected from electrical surges and having a line cord and a prong-type electrical plug at the one end of said line cord, the prong-type electrical plug having the prongs inserted into the female inlet of the said surge protector.

10. The system of claim 8 wherein the electrical apparatus comprises a telecopier, a telephone, a copying machine, modems, telex machine, personal computer or a printer.

11. A visual indicator electrical plug surge protector which comprises:

(a) a molded polymeric plug body comprising a generally transparent polymer and a thin layer of said polymer extends over the outward surface of the varistor means;

(b) the plug body having on one face a grounding prong and a pair of parallel male electrical prongs, the grounding prong and the electrical prongs adapted to be inserted into an electrical output plug;

(c) the plug body having on an other face a female grounding plug inlet and pair of female electrical plug inlets in electrical communication with the respective male grounding prong and male plug prongs and adapted to receive therein an electrical plug from an electrical apparatus which apparatus is to be protected from electrical surges from the electrical outlet plug; and (d) a varistor means comprising a metal oxide varistor of a flat circular material which changes to a dark color on activation which is in electrical communication to act as a surge protector for electrical signals from the electrical outlet plug, the varistor means positioned slightly below the face of the transparent plug body which face extends upwardly so that the varistor means is easily visible when the surge protector plug is inserted into the electrical outlet plug and adapted to be activated and change to a dark color on the occurrence of an electrical surge whereby the user by visually observing the varistor means can determine if an electrical surge has occurred and can replace the said activated surge protector.

* * * * *